(12) United States Patent
Wittkopp et al.

(10) Patent No.: US 8,826,758 B2
(45) Date of Patent: Sep. 9, 2014

(54) MULTI-SPEED TRANSMISSION

(75) Inventors: Scott H. Wittkopp, Ypsilanti, MI (US); Craig S. Ross, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 189 days.

(21) Appl. No.: 13/610,933

(22) Filed: Sep. 12, 2012

(65) Prior Publication Data

US 2014/0069217 A1    Mar. 13, 2014

(51) Int. Cl.
*F16H 3/08* (2006.01)

(52) U.S. Cl.
USPC .......................................................... 74/331

(58) Field of Classification Search
CPC ......... F16H 3/08; F16H 3/006; F16H 61/688; F16H 2003/0931
USPC ................................................... 74/325, 331
See application file for complete search history.

(56) References Cited

U.S. PATENT DOCUMENTS

| | | | |
|---|---|---|---|
| 2011/0120244 A1* | 5/2011 | Geiberger et al. | 74/339 |
| 2011/0214521 A1* | 9/2011 | Rockenbach et al. | 74/331 |
| 2012/0132021 A1* | 5/2012 | Oh et al. | 74/325 |
| 2012/0137805 A1* | 6/2012 | Oh et al. | 74/339 |
| 2013/0312561 A1* | 11/2013 | Garabello et al. | 74/473.11 |

* cited by examiner

*Primary Examiner* — Ha D Ho

(57) ABSTRACT

A transmission includes an input member, an output member, first and second transmission input shafts, first and second countershafts, a plurality of co-planar gear sets and a plurality of torque transmitting devices. The torque transmitting devices include a plurality of synchronizer assemblies and a dual clutch assembly. The transmission is operable to provide at least one reverse speed ratio and six forward speed ratios between the input member and the output member.

20 Claims, 2 Drawing Sheets

MULTI-SPEED TRANSMISSION

TECHNICAL FIELD

The present disclosure relates to transmissions and more particularly to a compact transmission having three axes of rotation to establish at least six gear speeds and a reverse gear speed.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having a transmission housing, a first, second, third, fourth, fifth and sixth gear sets, a transmission input shaft or member, a first and second countershaft, a first and second transfer gear, an output gear and seven synchronizer assemblies.

In still another embodiment of the present invention, second, third, fourth, fifth and sixth gear sets each include a first gear in mesh with a second gear. Further, the first gear set includes a first gear in mesh with a second gear and a second gear in mesh with a third gear.

In still another embodiment of the present invention, the transmission input shaft is rotatably supported in the transmission housing. The first gears of the first, third and fifth gear sets are rotatably fixed for common rotation with the transmission input shaft.

In still another embodiment of the present invention, the first countershaft is rotatably supported within the transmission housing and spaced apart from and parallel with the transmission input shaft member. Each of the second gears of the first, third and fifth gear sets are selectively connectable for common rotation with the first countershaft.

In still another embodiment of the present invention, the first transfer gear is fixedly connected for common rotation with the first countershaft.

In still another embodiment of the present invention, the second countershaft is rotatably supported within the transmission housing and spaced apart from and parallel with the transmission input shaft member. The third gear of the first gear set is selectively connectable for common rotation with the second countershaft.

In still another embodiment of the present invention, the output gear is supported for rotation in the transmission housing and the first and second transfer gear meshes with the output gear.

In still another embodiment of the present invention, the seven synchronizer assemblies each selectively couple at least one of the gears of the first, second, third, fourth, fifth and sixth gear sets with at least one of the first countershaft and the second countershaft.

In still another embodiment of the present invention, a first of the seven synchronizer assemblies selectively connects the first gear of the second gear set to the transmission input member.

In still another embodiment of the present invention, a second of the seven synchronizer assemblies selectively connects the third gear of the first gear set to the second countershaft.

In still another embodiment of the present invention, a third of the seven synchronizer assemblies selectively connects the second gear of the first gear set to the first countershaft.

In still another embodiment of the present invention, a fourth of the seven synchronizer assemblies selectively connects the first gear of the fourth gear set to the transmission input shaft.

In still another embodiment of the present invention, a fifth of the seven synchronizer assemblies selectively connects the second gear of the third gear set to the first countershaft.

In still another embodiment of the present invention, a sixth of the seven synchronizer assemblies selectively connects the first gear of the sixth gear set to the transmission input shaft.

In still another embodiment of the present invention, a seventh of the seven synchronizer assemblies selectively connects the second gear of the fifth gear set to the first countershaft.

In still another embodiment of the present invention, the first gear set is adjacent the clutch assembly, the second gear set is adjacent the first gear set, the third gear set is adjacent the second gear set, the fourth gear set is adjacent the third gear set, the fifth gear set is adjacent the fourth gear set, the fifth gear set is adjacent the fourth gear set and the sixth gear set is disposed between an end wall of the transmission housing and the fifth gear set.

In still another embodiment of the present invention, the first gear set provides a second forward speed ratio and a reverse speed ratio, the second gear set provides a third forward speed ratio, the third gear set provides a sixth speed ratio, the fourth gear set provides an fifth forward speed ratio, the fifth gear set provides a fourth forward speed ratio and the sixth gear set provides a first forward speed ratio.

In still another embodiment of the present invention, a seventh gear set and an eighth synchronizer is provided to produce a seventh gear ratio. The seventh gear set includes a first gear rotationally fixed to the transmission input shaft and a second gear in mesh with the first gear and selectively connectable to the first countershaft. The seventh gear set is disposed between the fourth and fifth gear sets. The eighth synchronizer selectively connects the second gear of the seventh gear set to the first countershaft.

The above features and advantages and other features and advantages of the present invention are readily apparent from the following detailed description of the best modes for carrying out the invention when taken in connection with the accompanying drawings.

DESCRIPTION

Figure 1:
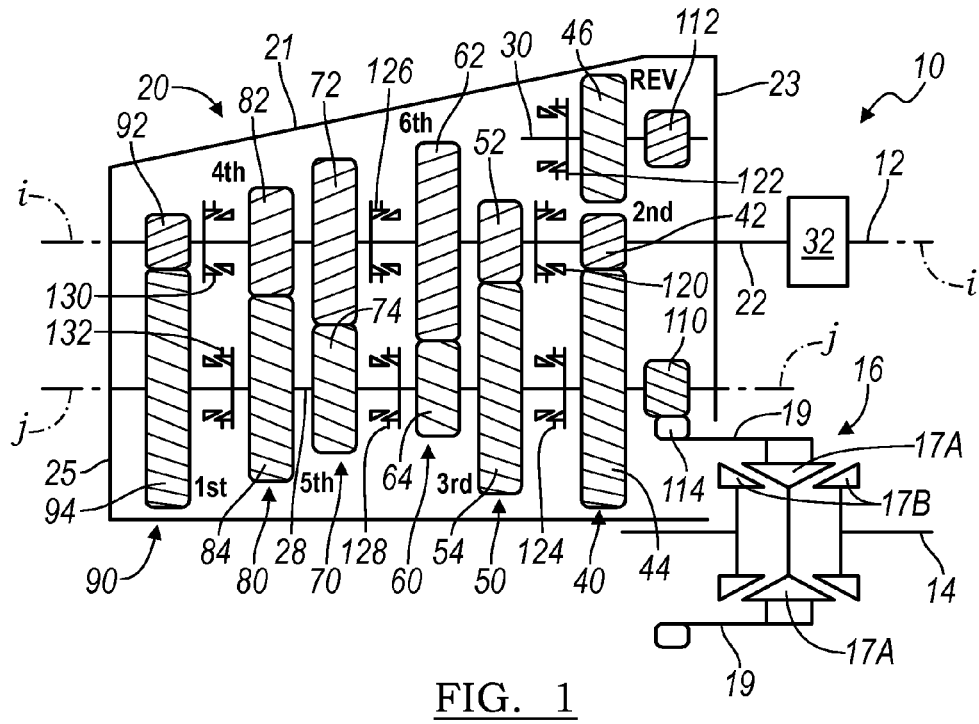
FIG. 1 is a schematic diagram of an embodiment of a six speed transmission, in accordance with the present invention.

Referring to FIG. 1, a multiple speed transmission is generally indicated by reference number 10. The transmission 10 includes an input shaft member 12, an output member 14 and a gearing arrangement 20. The input shaft member 12 may be separate from the transmission 10 and form part of or be connected with a flywheel or other output from an engine (not shown). The output member 14 is rotatably driven by a final drive assembly 16. More specifically, the final drive assembly 16 includes a first differential gear set 17a coupled to and supported in a differential housing 19. The first differential gear set 17a intermeshes with a second differential gear set 17b supported for common rotation on output member 14.

The transmission 10 includes a housing 21 that at least partially encloses the gearing arrangement 20. The housing 21 includes end walls 23 and 25. End wall 23 is located on a front or engine side of the transmission 10 and end wall 25 is located on an opposite side of the transmission. The gearing arrangement 20 includes various shafts or members, co-planar intermeshing gear sets and selectively engageable synchronizers, as will be described herein.

For example, the gearing arrangement 20 includes a transmission input shaft or member 22, a countershaft 28 and a second countershaft 30. The countershafts 28 and 30 are spaced apart from and parallel with the transmission input shaft member 22. The transmission input shaft 22 defines a first axis of rotation i and the countershaft 28 defines a second axis of rotation j.

A clutch assembly or launch device 32 is connectable between the input shaft member 12 and the transmission input shaft member 22. The launch device 32 could be either a dry or a wet clutch assembly, fluid coupling, torque converter or the like. Selective engagement of launch device 32 connects the input shaft member 12 for common rotation with the transmission input shaft member 22.

The gearing arrangement 20 also includes a plurality of co-planar, intermeshing gear sets 40, 50, 60, 70, 80 and 90. Co-planar gear sets 50, 60, 70, 80 and 90 include intermeshing gear pairs: gear 52 and gear 54, gear 62 and gear 64, gear 72 and gear 74, gear 82 and gear 84, and gear 92 and gear 94, respectively. Co-planar gear set 40 includes three intermeshing gears: gear 42 intermeshes with gears 44 and gear 44 intermeshes with gear 46. In an embodiment of the present invention, gears 42, 62 and 82 are attached to and rotatably fixed for common rotation with the transmission input shaft member 22. Gears 54, 74 and 94 are attached to and rotatably fixed for common rotation with the first countershaft shaft 28. In contrast, gears 52, 72 and 92 are selectively connectable for common rotation with the transmission input shaft member 22. Further, gears 44, 64 and 84 are selectively connectable for common rotation with the first countershaft 28.

More specifically, co-planar gear set 40 includes gear 42, gear 44 and gear 46. Gear 42 is rotationally fixed or coupled for common rotation with the transmission input shaft 22 and intermeshes with gear 44. Gear 44 is selectively connectable for common rotation with the first countershaft 28 and intermeshes with gear 46. Gear 46 is selectively connectable for common rotation with the second countershaft 30. Gear set 40 is disposed adjacent the end wall 23.

Co-planar gear set 50 includes gear 52 and gear 54. Gear 52 is selectively connectable for common rotation with the transmission input shaft member 22 and intermeshes with gear 54. Gear 54 is rotatably fixed and connected for common rotation with the first countershaft 28. Gear set 50 is positioned adjacent gear set 40.

Co-planar gear set 60 includes gear 62 and gear 64. Gear 62 is rotatably fixed and connected for common rotation with the transmission input shaft member 22 and intermeshes with gear 64. Gear 64 is selectively connectable for common rotation with the first countershaft 28. Gear set 60 is disposed adjacent gear set 50.

Co-planar gear set 70 includes gear 72 and gear 74. Gear 72 is selectively connectable for common rotation with the transmission input shaft member 22 and intermeshes with gear 74. Gear 74 is rotatably fixed and connected for common rotation with the first countershaft 28. Gear set 70 is located adjacent gear set 60.

Co-planar gear set 80 includes gear 82 and gear 84. Gear 82 is rotatably fixed and connected for common rotation with the transmission input shaft member 22 and intermeshes with gear 84. Gear 84 is selectively connectable for common rotation with the first countershaft 28. Gear set 80 is located adjacent gear set 70.

Co-planar gear set 90 includes gear 92 and gear 94. Gear 92 is selectively connectable for common rotation with the transmission input shaft member 22 and intermeshes with gear 94. Gear 94 is rotatably fixed and connected for common rotation with the first countershaft 28. Gear set 90 is positioned adjacent gear set 80.

Further, a countershaft transfer gear 110 is rotatably fixed and connected for common rotation with the first countershaft 28. A second countershaft transfer gear 112 is rotatably fixed and connected for common rotation with the second countershaft 30. First countershaft transfer gear 110 and the second countershaft transfer gear 112 are each configured to mesh with an output transfer gear 114. However, the first countershaft transfer gear 110 and the second countershaft transfer gear 112 do not mesh with each other. The first countershaft transfer gear 110 is disposed between gear 44 and end wall 23. The second countershaft transfer gear 112 is disposed between gear 46 and end wall 23. The output transfer member 114 is co-planar with first and second countershaft transfer gears 110, 112 and positioned between the gear set 40 and end wall 23. The output transfer member 114 is attached and rotatably drives a differential housing 19.

The transmission 10 further includes a plurality of selectively actuatable synchronizer assemblies 120, 122, 124, 126, 128, 130 and 132. Synchronizers 120, 122, 124, 126, 128, 130 and 132 are single sided synchronizers that generally include a shift fork (not shown) that is bi-directionally translated by an actuator (not shown) into either an engaged position or a neutral or disengaged position. In the present embodiment, synchronizer 120 is selectively actuatable to connect gear 52 for common rotation with the transmission input shaft 22. Synchronizer 122 is selectively actuatable to connect for common rotation gear 46 with the second countershaft 30. Synchronizer 124 is selectively actuatable to connect for common rotation gear 44 with first countershaft 28. Synchronizer 126 is selectively actuatable to connect for common rotation gear 72 with transmission input shaft 22. Synchronizer 128 is selectively actuatable to connect for common rotation gear 64 with the first countershaft 28. Synchronizer 130 is selectively actuatable to connect for common rotation gear 92 with transmission input shaft 22. Synchronizer 132 is selectively actuatable to connect for common rotation gear 84 with the first countershaft 28.

The transmission 10 is capable of transmitting torque from the input shaft member 12 to the output member 14 in at least six forward torque ratios and at least one reverse torque ratio.

Each of the forward torque ratios and the reverse torque ratio is attained by selective engagement of the clutch assembly 32 and one or more of the synchronizer assemblies 120, 122, 124, 126, 128, 130 and 132. Those skilled in the art will readily understand that a different speed ratio is associated with each torque ratio.

It should be appreciated that each individual gear set 40, 50, 60, 70, 80 and 90 provides one or more forward and/or reverse gear ratios upon selective engagement of the synchronizer assemblies. However, which synchronizer and which gear set are associated with a particular forward or reverse speed ratio may vary without departing from the scope of the present invention.

For example, to establish the reverse torque ratio, clutch assembly 32 is engaged to couple the input shaft member 12 with the transmission input shaft 22 and synchronizer 122 is engaged to connect gear 46 to the second countershaft shaft 30, respectively. More specifically, input torque from the input shaft member 12 is transferred through the clutch assembly 32 to the transmission input shaft 22 and to gear 42. Torque is transferred from gear 42 to gear 44, through gear 44 to gear 46, from gear 46 to synchronizer 122, from synchronizer 122 to second countershaft 30, from second countershaft 30 to transfer gear 112, from transfer gear 112 to output transfer gear 114 and from output transfer gear 114 to differential housing 19.

To establish a first forward torque ratio (i.e. a 1st gear), clutch assembly 32 is engaged to couple the input shaft member 12 with the transmission input shaft member 22. Synchronizer 130 is activated to couple gear 92 to the transmission input shaft member 22. More specifically, input torque from the input shaft member 12 is transferred through the clutch assembly 32 to the transmission input shaft member 22 to synchronizer 130. Synchronizer 130 transfers the torque gear 92. Gear 92 transfers torque to gear 94 which transfers the torque to the first countershaft 28. First countershaft 28 transfers torque to transfer gear 110. Transfer gear 110 transfers torque to output transfer gear 114 and from output transfer gear 114 to differential housing 19.

To establish a second forward torque ratio (i.e. a 2nd gear), clutch assembly 32 is engaged to couple the input shaft member 12 to the transmission input shaft 22 and synchronizer 124 is activated to couple gear 44 to the transmission input shaft 22. Accordingly, input torque from the input shaft member 12 is transferred through the clutch assembly 32 to the transmission input shaft member 22. Gear 42 transfers the torque to gear 44. Synchronizer 124 transfers torque to gear 44. Gear 44 transfers torque to first countershaft 28 and to transfer gear 110. Transfer gear 110 transfers torque to output transfer gear 114 and from output transfer gear 114 to differential housing 19.

To establish a third forward torque ratio (i.e. a 3rd gear), clutch assembly 32 is engaged to couple the input shaft member 12 to the transmission input shaft 22 and synchronizer 120 is engaged to couple gear 52 to the transmission input shaft 22. Accordingly, input torque from the input shaft member 12 is transferred through the clutch assembly 32 to the transmission input shaft member 22 to synchronizer 120. Synchronizer 120 transfers torque to gear 52 which transfers the torque to gear 54. Gear 54 transfers torque to the first countershaft 28. First countershaft 28 to transfer gear 110, from transfer gear 110 to output transfer gear 114 and from output transfer gear 114 to differential housing 19.

To establish a fourth forward torque ratio (i.e. a 4th gear), clutch assembly 32 is engaged to couple the input shaft member 12 to the transmission input shaft member 22 and synchronizer 132 is activated to couple gear 84 to first countershaft 28. Thus, input torque from the input shaft member 12 is transferred through the clutch assembly 32 to the transmission input shaft 22 to gear 82. Gear 82 transfers torque to gear 84. Gear 84 transfers torque to synchronizer 132. Synchronizer 132 transfers torque to the first countershaft 28, from the first countershaft 28 to transfer gear 110, from transfer gear 110 to output transfer gear 114 and from output transfer gear 114 to differential housing 19.

To establish a fifth forward torque ratio (i.e. a 5th gear), clutch assembly 32 is engaged to couple the input shaft member 12 to the transmission input shaft 22 and synchronizer 126 is activated to couple gear 72 to the transmission input shaft 22. Thus, input torque from the input shaft member 12 is transferred through the clutch assembly 32 to the transmission input shaft 22 to synchronizer 126. Synchronizer 126 transfers torque to gear 72. Gear 72 transfers torque to gear 74. Torque is then transferred from gear 74 to the first countershaft 28, from the first countershaft 28 to transfer gear 110, from transfer gear 110 to output transfer gear 114 and from output transfer gear 114 to differential housing 19.

To establish a sixth forward torque ratio (i.e. a 6th gear), clutch assembly 32 is engaged to couple the input shaft member 12 to the transmission input shaft 22 and synchronizer 128 is activated to couple gear 64 to the first countershaft 28. Thus, input torque from the input shaft member 12 is transferred through the clutch assembly 32 to the transmission input shaft 22 to gear 62. Gear 62 transfers torque to gear 64. Gear 64 transfers torque to synchronizer 128. Synchronizer 128 transfers the torque to the first countershaft 28 and to transfer gear 110. Transfer gear 110 transfers torque to output transfer gear 114 and from output transfer gear 114 to differential housing 19.

Figure 2:
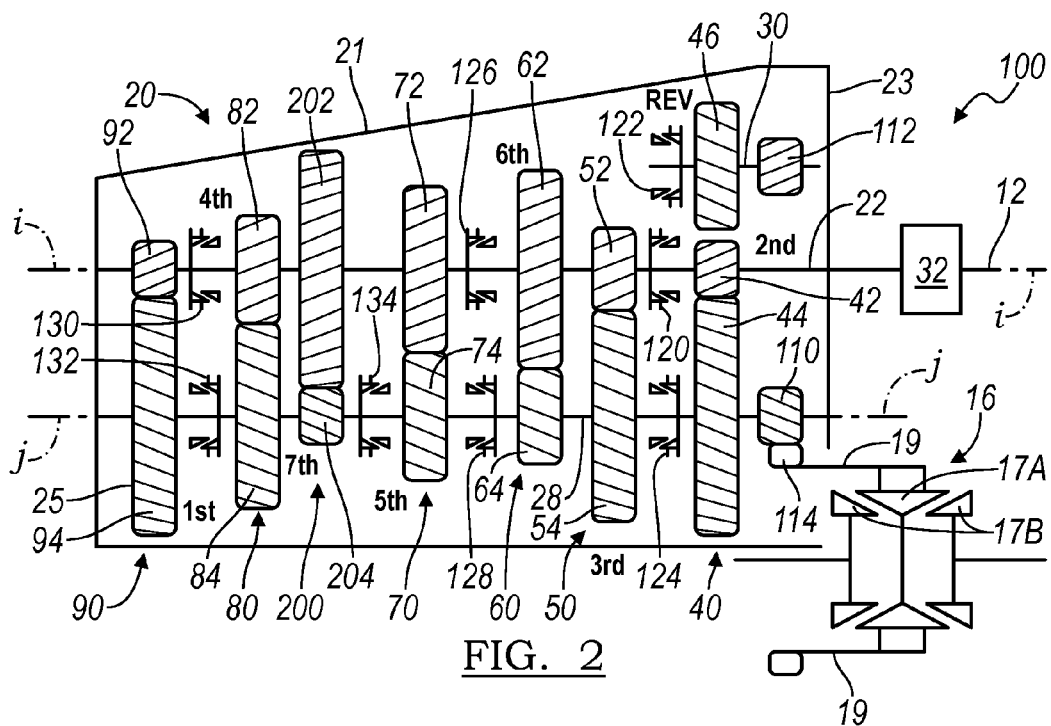
FIG. 2 is a schematic diagram of an embodiment of a seven speed transmission, in accordance with the present invention.

Referring now to FIG. 2, a schematic diagram of an embodiment of a seven speed transmission 100 is illustrated, in accordance with the present invention. Transmission 100 has the same components as transmission 10 as indicated by like reference numbers. However, transmission 100 has an additional gear set 200 and an additional synchronizer 134 that provides an additional forward gear ratio (i.e. a seventh gear ratio). Gear set 200 is disposed between gear set 70 and gear set 80. Gear set 200 has a first gear 202 in mesh with a second gear 204. Gear 202 is fixed for common rotation with transmission input member 22. Gear 204 is selectively connectable to second countershaft 28 though an eighth synchronizer 134. The seventh gear ratio is achieved by transferring torque through the input shaft 12 to transmission input shaft 22. Transmission input shaft 22 transfers torque to gear 202 and gear 202 transfers the torque to gear 204. Synchronizer 134 transfers the torque from gear 204 to first countershaft 28 and transfer gear 110. Transfer gear 110 transfers torque to output transfer gear 114 and from output transfer gear 114 to differential housing 19.

Figure 3:
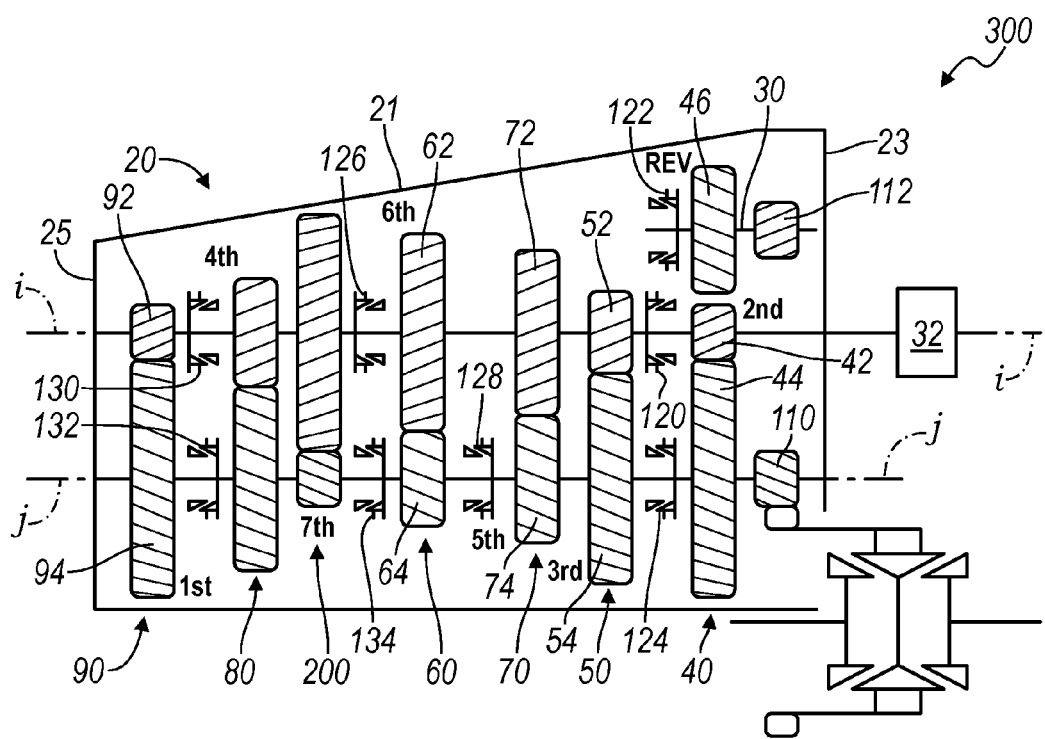
FIG. 3 is a schematic diagram of an embodiment of a seven speed transmission, in accordance with the present invention.

Referring now to FIG. 3, a schematic diagram of an embodiment of yet another seven speed transmission 300 is illustrated, in accordance with the present invention. Transmission 300 has the same components as transmission 100, as indicated by like reference numbers. However, transmission 300 has a different arrangement of the co-planar gear sets along transmission input member 22. More specifically, gear set 60 which produces the sixth forward ratio is adjacent gear set 200 instead of gear set 70 being disposed adjacent gear set 200 and gear set 70 is disposed adjacent gear set 50 instead of gear set 60 being disposed adjacent gear set 50, as is the case in transmission 100 of FIG. 2.

The present invention contemplates that a variety of torque ratios (i.e., the ratio of torque of the output member 14 to the input shaft member 12) are achievable through the selection The following is claimed:

1. A transmission comprising:
a transmission housing;
a first, second, third, fourth, fifth and sixth gear sets, wherein each of the gear sets include a first gear in mesh with a second gear and wherein the first gear set further includes a third gear in mesh with the second gear;
a transmission input shaft member rotatably supported in the transmission housing and wherein the first gears of the first, third and fifth gear sets are rotatably fixed for common rotation with the transmission input shaft member and wherein the first gears of the second, fourth and sixth gear sets are selectively connectable for common rotation with the transmission input shaft member;
a first countershaft rotatably supported within the transmission housing and spaced apart from and parallel with the transmission input shaft member, wherein each of the second gears of the second, fourth and sixth gear sets are rotatably fixed for common rotation with the countershaft and wherein the second gears of the first, third and fifth gear sets are selectively connectable for common rotation with the first countershaft;
a second countershaft rotatably supported within the transmission housing and spaced apart from and parallel with the transmission input shaft member, wherein the third gear of the first gear set is selectively connectable for common rotation with the second countershaft; and
seven synchronizer assemblies each for selectively coupling at least one of the gears of the first, second, third, fourth, fifth and sixth gear sets with at least one of the transmission input shaft member, the first countershaft and the second countershaft, and
wherein the selective engagement of at least one of the seven synchronizer assemblies establishes at least one of six forward speed ratios and at least one reverse speed ratio.

2. The transmission of claim 1 wherein a first of the seven synchronizer assemblies selectively connects the first gear of the second gear set to the transmission input shaft member.

3. The transmission of claim 2 wherein a second of the seven synchronizer assemblies selectively connects the third gear of the first gear set to the second countershaft.

4. The transmission of claim 3 wherein a third of the seven synchronizer assemblies selectively connects the second gear of the first gear set to the first countershaft.

5. The transmission of claim 4 wherein a fourth of the seven synchronizer assemblies selectively connects the first gear of the fourth gear set to the transmission input shaft member.

6. The transmission of claim 5 wherein a fifth of the seven synchronizer assemblies selectively connects the second gear of the third gear set to the first countershaft.

7. The transmission of claim 6 wherein a sixth of the seven synchronizer assemblies selectively connects the first gear of the sixth gear set to the transmission input shaft member.

8. The transmission of claim 7 wherein a seventh of the seven synchronizer assemblies selectively connects the second gear of the fifth gear set to the first countershaft.

9. The transmission of claim 1 wherein the first gear set is adjacent a first end wall of the transmission housing, the second gear set is adjacent the first gear set, the third gear set is adjacent the second gear set, the fourth gear set is adjacent the third gear set, the fifth gear set is adjacent the fourth gear set and the sixth gear set is between a second end wall of the transmission housing and the fifth gear set.

10. The transmission of claim 9 wherein the first gear set provides a second forward speed ratio and a reverse speed ratio.

11. The transmission of claim 10 further including a first and a second transfer gear and an output gear, wherein the first transfer gear is rotatably fixed to the first countershaft and in mesh with the output gear and the second transfer gear is rotatably fixed to the second countershaft and in mesh with the output gear.

12. A transmission comprising:
a transmission housing;
a first, second, third, fourth, fifth, sixth and seventh gear sets, wherein each of the gear sets include a first gear in mesh with a second gear and wherein the first gear set further includes a third gear in mesh with the second gear;
a transmission input shaft member rotatably supported in the transmission housing and wherein the first gears of the first, third, fifth and seventh gear sets are rotatably fixed for common rotation with the transmission input shaft member and wherein the first gears of the second, fourth and sixth gear sets are selectively connectable for common rotation with the transmission input shaft member;
a first countershaft rotatably supported within the transmission housing and spaced apart from and parallel with the transmission input shaft member, wherein each of the second gears of the second, fourth and sixth gear sets are rotatably fixed for common rotation with the first countershaft and wherein the second gears of the first, third, fifth and seventh gear sets are selectively connectable for common rotation with the first countershaft;
a second countershaft rotatably supported within the transmission housing and spaced apart from and parallel with the transmission input shaft member, wherein the third gear of the first gear set is selectively connectable for common rotation with the second countershaft; and
eight synchronizer assemblies each for selectively coupling at least one of the gears of the first, second, third, fourth, fifth, sixth and seventh gear sets with at least one of the transmission input shaft member, the first countershaft and the second countershaft, and
wherein the selective engagement of at least one of the eight synchronizer assemblies establishes at least one of seven forward speed ratios and at least one reverse speed ratio.

13. The transmission of claim 12 wherein a first of the eight synchronizer assemblies selectively connects the first gear of the second gear set to the transmission input shaft member.

14. The transmission of claim 13 wherein a second of the eight synchronizer assemblies selectively connects the third gear of the first gear set to the second countershaft.

15. The transmission of claim 14 wherein a third of the eight synchronizer assemblies selectively connects the second gear of the first gear set to the first countershaft.

16. The transmission of claim 15 wherein a fourth of the eight synchronizer assemblies selectively connects the first gear of the fourth gear set to the transmission input shaft member.

17. The transmission of claim 16 wherein a fifth of the eight synchronizer assemblies selectively connects the second gear of the third gear set to the first countershaft.

18. The transmission of claim 17 wherein a sixth of the eight synchronizer assemblies selectively connects the first gear of the sixth gear set to the transmission input shaft member.

19. The transmission of claim 18 wherein a seventh of the eight synchronizer assemblies selectively connects the second gear of the fifth gear set to the first countershaft.

20. The transmission of claim 19 wherein a eighth of the eight synchronizer assemblies selectively connects the second gear of the seventh gear set to the first countershaft.

\* \* \* \* \*